United States Patent Office 3,082,084
Patented Mar. 19, 1963

3,082,084
PROCESS FOR PRODUCING A DISPERSION OF AN OXIDE IN A METAL
Guy B. Alexander and Paul C. Yates, Brandywine Hundred, Del., assignors to E. I. du Pont de Nemours and Company, Wilmington, Del., a corporation of Delaware
No Drawing. Filed May 9, 1960, Ser. No. 27,967
8 Claims. (Cl. 75—206)

This invention relates to modifying high-melting metals with dispersed refractory metal oxides. More particularly the invention is directed to processes for making novel compositions comprising a dispersion, in a metal (a) having a melting point above 1200° C. and having an oxide with a free energy of formation at 27° C. of from 75 to 105 kilocalories per gram atom of oxygen in the oxide, of a refractory metal oxide (b) which is stable up to 1000° C. and has a melting point above 1000° C. and a free energy of formation at 1000° C. above about 100 kilocalories per gram atom of oxygen in the oxide, said refractory oxide being in the form of substantially discrete particles having an average dimension of 5 to 500 millimicrons, the dispersion being in the form of a powder, the particles of which have a density in the range of 80 to 100% of theoretical density, have an oxygen content, in excess of oxygen in said refractory metal oxide particles, of from 0 to 2% by weight, and the metal in which is in the form of grains smaller than 10 microns, and for making solid metal products containing dispersed refractory oxide particles by solidifying the novel metal powders. Said processes comprise forming a coating of a compound of a metal in an oxidized state, the metal being one having an oxide with a free energy of formation at 27° C. of 75 to 105 kilocalories per gram atom of oxygen in the oxide, said coating being formed around particles of refractory metal oxide (b), the particles being substantially discrete and having an average dimension of 5 to 500 millimicrons, thereafter dispersing the compound-coated refractory oxide particles in a molten salt, adding a reducing metal selected from the group consisting of alkali and alkaline earth metals while maintining the temperature of the molten salt in the range from 400 to 1200° C., the proportion of reducing metal being at least stoichiometrically equivalent to the oxidizing element of the coating on the refractory oxide particles, whereby the coating is reduced to metal, and separating the resulting metal-coated refractory oxide particles as a powder from the salt and the other products of the reduction reaction. This invention is also particularly directed to processes for forming solid metal products containing said dispersed oxides, the processes comprising compacting the novel powder compositions to substantially theoretical density.

The so-called "super alloys" have been developed for service at extremely high temperatures under very high stress and strain and with the maximum possible service life. In each of these directions, however, substantial additional improvement is greatly desired. An object of the present invention is to provide metal compositions having improved properties in one or more of these respects.

It has been suggested that such improvement might be accomplished by dispersing metal oxides in the metals, but no practical means for effecting such dispersion has heretofore been available. If one attempts to grind a solid, dense mass of the oxide and disperse the ground oxide in the metal, the dispersion contains particles which are far too large to be effective, since if a large enough number of particles is used, the metal product lacks ductility. It is impossible by known means to grind hard materials, such as refractory oxides, to a size smaller than about one micron.

If, on the other hand, one precipitates the refractory oxide as aggregates of particles which, individually and in their non-aggregated state are of colloidal size, and then attempts to coat the aggregates with metal, one finds that the metal merely envelopes the aggregate as an outer skin and does not penetrate adequately into the aggregate. The particle density of such products is substantially less than 80 percent of theoretical, and they are extremely difficult, if not impossible, to compact into solid metals. A further object of the present invention is to provide refractory metal oxide particles dispersed in metals in the form of powders, wherein the density is about from 80 to 100 percent of theoretical. Further objects will become evident hereinafter.

Now according to the present invention, it has been found that the foregoing and other objects can be accomplished by processes for producing compositions comprising dispersions, in certain high-melting metals, of very refractory metal oxide particles, provided the dispersed particles are substantially discrete, have an average dimension of 5 to 500 millimicrons, and are substantially completely in contact with the high-melting metal so that the density is very close to theoretical. The dispersed refractory oxide particles must be properly selected, both as to chemical constitution and physical characteristics, in order to be operative in the process and to give ultimate products having the desired improvement in properties. The metal in the aggregate must also be selected with regard to its chemical characteristics if compositions of the invention are to be attained. The compositions can be in the form of powders suitable for use in powder metallurgy, or in the form of solid metal compositions produced by compacting the powders.

The processes of the invention, which are useful for producing compositions as just described, comprise forming a coating of a compound of the metal ultimately to be produced in metallic form, said compound containing the metal in an oxidized state, the coating being formed around the suitable refractory oxide particles, thereafter dispersing the coated particles in a molten salt bath, adding a reducing metal to the salt bath under conditions which effect reduction of the metal compound to the corresponding metal, and separating the metal-refractory oxide aggregates thus formed from the salt and other products of the reduction reaction, whereby the product is recovered as a powder. The powder can be compacted to solid metal having substantially improved high-temperature properties.

For convenience in describing this invention certain abbreviations will be used. Free energy of formation will be kilocalories per gram atom of oxygen in the oxide, as determined at 27° C. unless otherwise specified, and will be called ΔF. Surface areas of the refractory oxides will be in terms of square meters per gram, and particle diameters will be millimicrons, abbreviated m$\mu$. Particle densities will be grams per milliliter. The particulate refractory oxide will sometimes be referred to as the filler.

THE REFRACTORY OXIDE PARTICLES

The refractory oxide employed as a starting material is one which is relatively non-reducible—that is, an oxide which is not easily reduced by the reducing metal subsequently to be added, especially at the temperature of the fused salt bath. The free energy of formation at 1000° C. of refractory oxides is an indication of their ease of reducibility, the higher the ΔF, the less reducible the oxide. The reduction conditions in the fused salt bath are so rigorous that only refractory metal oxides having a ΔF, at 1000° C., above 100 kilocalories are suitable.

It will be apparent that the refractory oxide itself can be used as the starting material or the oxide can be formed during the process, as by heating another metal-oxygen-containing material. For instance, calcium oxide suitable for use as the refractory can be formed in situ by heating calcium carbonate. The metal-oxygen-containing material can, for example, be selected from the group consisting of oxides, carbonates, oxalates, and, in general, compounds which, after heating to constant weight at 1500° C., are refractory metal oxides. The ultimate oxide must have a melting point above 1000° C. A material with a melting point in this range is referred to as "refractory"—that is, difficult to fuse. Particles which melt or sinter at lower temperatures become aggregated.

The refractory can be a mixed oxide, particularly one in which each oxide conforms to the melting point and $\Delta F$ stated above. Thus, the refractory can be a single metal oxide or a reaction product of two or more metal oxides, preferably each of which is useful alone.

Typical single oxide refractories are calcium oxide, thoria, magnesia and the rare earth oxides including didymium oxide. A more complete list of suitable oxides, together with their free energies of formation is shown below.

| Oxide: | $\Delta F$ at 1000° C. |
|---|---|
| $Y_2O_3$ | 125 |
| $CaO$ | 122 |
| $La_2O_3$ | 121 |
| $BeO$ | 120 |
| $ThO_2$ | 119 |
| $MgO$ | 112 |
| $UO_2$ | 105 |
| $HfO_2$ | 105 |
| $CeO_2$ | 105 |
| $Al_2O_3$ | 104 |
| $ZrO_2$ | 100 |

The refractory oxide must initially be in a finely divided state. The substantially discrete particles should have an average dimension in the size range of 5 to 500 m$\mu$, an especially preferred range being from 5 to 250 m$\mu$ with a minimum of 10m$\mu$ being even more preferred. (Note that 250 m$\mu$ particles have a surface area of 24/D, and 10 m$\mu$, of 600/D.)

Powders of refractory oxides prepared by burning the corresponding metal chlorides, as, for example, by burning zirconium tetrachloride or thorium tetrachloride, to the oxide, are also very useful if the oxides are obtained primarily as discrete, individual particles, or aggregated structures which can be dispersed to such particles. However, because colloidal metal oxide aquasols already contain particles in the most desirable size range and state of subdivision, these are preferred starting materials for use in the compositions and processes of the invention.

The art is familiar with various methods for producing aquasols of colloidal metal oxides. The preparation of sols as described by Weiser in "Inorganic Colloidal Chemistry," vol. 2, "Hydrous Oxides and Hydroxides," for example, can be used to advantage. For instance, at page 177 of the 1935 edition there is described the preparation of a beryllia aquasol which can be used in the novel processes and product.

Especially preferred as starting materials are thoria aquasols prepared by hydrolyzing thorium nitrate.

The refractory particles should be dense and anhydrous for best results, but aggregates of smaller particles can be used, provided the discrete particles of aggregate have the above-mentioned dimensions. Particles which are substantially spheroidal or cubical in shape are also preferred, although anisotropic particles such as fibers or platelets can be used for specail effects.

The size of a particle is given as an average dimension. For anisotropic particles the size is considered to be one third of the sum of the three particle dimensions. For example, a fiber of alumina might be 500 m$\mu$ long but only 10 m$\mu$ wide and thick. The size of this particle is $$\frac{500+10+10}{3}$$

or 173 m$\mu$, and hence within the limits of this invention.

The initial refractory oxide preferably should not only have the particle size as above stated but also should have a surface area, in square meters per gram of from 12/D to 1200/D, where D is the density of the particles in grams per milliliter. For instance, thoria particles have a density of 9.7 grams/milliliter; hence when thoria is used it should have a surface area from 1.2 to 124 square meters per gram.

The refractory oxide must be relatively insoluble in the metal of the ultimate aggregate. If the refractory oxide dissolved, it would, of course, lose its necessary physical characteristics and become valueless for its intended use.

Similarly, the refractory oxide must be thermally stable to at least 1000° C. Again, if the oxide decomposed upon heating, it would lose its physical and chemical identity, and since the products of the invention are intended for use at elevated temperatures, this limitation as to thermal stability is essential.

THE METAL OF THE DISPERSION

The metal associated with the refractory oxide particles in a dispersion made by a process of this invention is one having a very high melting point and having an oxide with a relatively high free energy of formation at 27° C. Metals in this category are not readily amenable to formulation by reduction from their compounds in which they are present in an oxidized state; however, they are easily prepared by the processes of the present invention.

The metals included in this group have a melting point above 1200° C. and have an oxide with a free energy of formation at 27° C. of from 75 to 105 kilocalories. The group includes manganese, niobium, silicon, tantalum, titanium, vanadium and chromium. The oxides of these metals, and their free energies of formation at 27° C. are shown in the following table:

| Metal | Oxide | $\Delta F$ at 27° C. |
|---|---|---|
| Chromium | $Cr_2O_3$ | 83 |
| Manganese | $MnO$ | 87 |
| Niobium | $NbO_2$ | 90 |
| Silicon | $SiO_2$ | 98 |
| Tantalum | $Ta_2O_5$ | 92 |
| Titanium | $TiO_2$ | 103 |
| Vanadium | $VO$ | 99 |

COATING THE REFRACTORY WITH METAL COMPOUND

In carrying out a process of this invention, having selected a refractory oxide filler as above described one coats the filler particles with a compound of the selected metal in an oxidized state, the coating being formed around the individual particles of the refractory oxide.

The method used for coating the refractory particles with the compound must be one which will not cause the particles to agglomerate or to grow to a size outside the stated range. With the high-melting metals here involved, it is essential that the refractory have the properties as already described above.

The compound of the metal can be the oxide, hydroxide, hydrous oxide, oxycarbonate, hydroxycarbonate, or any other compound in which the metal is in an oxidized state. Since the compounds just mentioned, as precipitated, usually contain varying amounts of water, they will hereinafter be referred to generally as hydrous, oxygen-containing compounds of the metal.

The precipitated metal compound used can be one of a single metal or of two or more metals, at least one of which is of the group above identified. For example, the hydrous oxides of both chromium and titanium can be deposited around the refractory particles. In the latter case, an alloy of chromium and titanium is produced directly, during the reduction step.

In the processes of the invention compounds of other oxidized metals, in addition to the class above mentioned, can be used. Thus, the processes include using other metals whose oxides have a free energy of formation at 27° C. less than 105 kilocalories, in combination with manganese, niobium, silicon, tantalum, titanium, vanadium or chromium.

Hydrous, oxygen-containing compounds of the metals can be precipitated from solutions in which they are present as the corresponding soluble salt. For example, the salt can be a nitrate, chloride, sulfate, or acetate; thus, chromium nitrate, chromium chloride, titanium chloride, vanadium chloride, and sodium silicate are among the suitable starting materials.

Methods for precipitating oxygen-containing metal compounds from solutions of the corresponding metal salts are well known in the art and any such method can be used. For instance, an alkali can be added to a solution of the metal nitrate. When, on the other hand, the metal is in the form of a basic salt, such as sodium silicate, the precipitation can be effected by acidifying.

A preferred method for surrounding the refractory particles with the oxygen-containing compound of the metal is to coprecipitate the refractory particles from a colloidal aquasol simultaneously with the precipitation of the metal compound. One convenient way to do this is to add, simultaneously but separately, a solution of the soluble metal salt, a colloidal aquasol containing the refractory particles, and an alkali such as sodium hydroxide, to a heel of water. Alternatively, a dispersion containing the refractory particles can be used as a heel and the metal salt solution and alkali added simultaneously but separately thereto.

During such a coprecipitation process certain precautions are preferably observed. It is preferred not to coagulate or gel the refractory particles. Coagulation and gelation are avoided by working in dilute solutions, or by simultaneously adding the refractory and the metal salt solution to a heel.

The refractory particles should be completely surrounded with the precipitated, reducible metal compound, so that when reduction occurs later in the process, aggregation and coalescence of the refractory particles is avoided. In other words, the particles of the refractory are discrete and are not in contact, one with another, in the coprecipitated product. Vigorous mixing and agitation during the coprecipitation helps to insure the desired result.

After depositing the insoluble metal compound on the filler, any salts present are removed, as by washing. When one uses an alkali such as sodium hydroxide, potassium hydroxide, lithium hydroxide, ammonium hydroxide, or tetramethylammonium hydroxide to effect precipitation, salts such as sodium nitrate, ammonium nitrate or potassium nitrate are formed. These should be removed. One of the advantages of using the nitrate salts in combination with aqueous ammonia is that ammonium nitrate is volatile and therefore is easily removed from the product.

A very practical way to remove salts is by filtering off the precipitate and washing it on the filter or repulping the filter cake and again filtering.

After removing soluble salts the product is dried, preferably at ultimate temperatures above 100° C. Alternatively, the product can be dried, and the dry material suspended in water to remove the soluble salts, and the product thereafter redried.

The relative amount of insoluble metal compound deposited upon the refractory particles depends in part on the nature of the end product which it is desired to produce. For example, if the product is to be reduced and compacted directly to a dense mass of metal, the from 0.5 to 10 volume percent of refractory in the metal composition is a preferred range, and 1 to 5 volume percent is even more preferred. On the other hand, if the product is to be used as a masterbatch, as, for example for blending with a considerable quantity of unmodified metal powder before compaction, then considerably higher volume loadings can be used.

Volume loadings as high as 30 percent, that is, or volume of oxide for each 2½ volumes of metal present can be prepared, but such products tend to be pyrophoric. With compositions that are thus highly loaded, special precautions must be observed during the reduction step.

REDUCTION OF THE COATING ON THE REFRACTORY

Having deposited on the refractory particles the precipitate of compound of metal in oxidized state, and washed and dried the product, the next step is to reduce the metal compound to the corresponding metal. This done by subjecting the coated particles to a metal reducing agent in a fused salt bath. The compound-coated refractory oxide particles are dispersed in the molten salt and the reducing metal is added while maintaining the temperature of the molten salt in the range of 400 to 1200° C.

The fused salt bath is merely a medium whereby to effect contact of the reducing agent and the metal compound under conditions which will not affect the disposition of the compound with respect to the refractory particles. It can comprise any suitable salt or mixture of salts having the necessary stability, fusion point, and the like.

Suitable fused salt baths can comprise halides of metal selected from groups I and IIa of the periodic table.

In general, the chlorides and fluorides are preferred halides. Bromides or iodides can be used, although their stability at elevated temperatures is frequently insufficient. Chlorides are especially preferred. Thus, among the preferred salts are calcium chloride, sodium chloride, potassium chloride, barium chloride, strontium chloride, and lithium chloride and fluoride.

The fused salt bath will usually be operated under blanket of either an inert gas or a reducing gas. Such gases as helium, argon, or hydrogen gases can be used in this capacity.

The temperature of the reduction can be varied considerably, depending upon the combination of fused salt and reducing metal selected. In general, the temperature of reduction will be between 400 and 1200° C. is usually preferred to select a reduction temperature at which the reducing metal, as well as the fused salt, present in a molten state. Usually the operating temperature will also be below the boiling point of the reducing metal employed.

The operating temperature of the reduction bath must also be below the melting point of the metal coating to be produced on the refractory filler. For example, if tungsten compound is being reduced upon particles of thoria, reduction temperatures as high as 1200° C. can be employed. However, if a copper-containing alloy having a low melting point is being produced, the reduction temperature should be maintained below that of the melting point of the copper alloy.

The reducing metal is selected from the group consisting of alkali and alkaline earth metals. Thus, the metal can be lithium, sodium, potassium, rubidium, caseium beryllium, magnesium, calcium, strontium, or barium.

Within this group of reducing metals, the particular metal is selected by comparison of the ΔF of its oxide with that of the metal oxide to be reduced. The said ΔF must be greater than that of the metal oxide being reduced. If it is less than the ΔF of the particulate refractory, excess reducing metal will ordinarily not b bjectionable. If, however, the ΔF of the oxide of the educing metal is greater than the ΔF of the particulate efractory, only the stoichiometric proportion of metal equired to reduce the metal oxide should be used.

It is preferred to use a reducing metal which has a low olubility in the solid state with respect to the metal f the coating on the refractory oxide particles; otherwise, ne will get undesirable alloying of the reducing metal ith the metal formed by the reduction. For this reaon, calcium and sodium are suitable for reducing compounds of such metals as iron, cobalt, nickel, chromium, r tungsten, while magnesium and sodium are useful reducing titanium.

It is preferable to use a temperature of reduction at hich the reduction reaction proceeds at a rapid rate. or reducing cobalt, iron, and nickel compounds, temeratures in the range of 600 to 800° C. are suitable. Vith compounds of metals such as chromium, titanium, nd niobium, temperatures in the range of 850 to 1000° . are used.

Completion of the reduction reaction can be deterined by taking samples from the melt, separating the roduct from the fused salt, and analyzing for oxygen y ordinary analytical procedures such as vacuum fusion. he reduction is continued until the oxygen content of e mass is substantially reduced to zero, exclusive of the xygen of the oxide refractory material. In any case, e oxygen content of the product, exclusive of the oxyen in the refractory, should be broadly in the range of rom 0 to 2% and preferably from 0 to 0.5%, with 0 to .1%, based on the weight of the product, being specifially preferred. In the case of niobium alloys the excess xygen desirably should be substantially zero—that is, ss than 0.05%.

The reduced product is present as a suspension in the sed salt bath. It can be separated therefrom by the chniques ordinarily used for removing suspended maerials from liquids. Gravitational methods such as ettling, centrifuging, decanting and the like can be used, r the product can be filtered off. Alternatively, the bath an be cooled and the fused salt dissolved in a suitable olvent such as dilute aqueous nitric acid or acetic acid. If a considerable excess of reducing metal is used in e reduction step, it may be necessary to use a solvent ss reactive than water for the isolation procedure. In uch a case, methyl or ethyl alcohol is satisfactory. The resence of a small amount of acid in the isolation solent will dissolve any insoluble oxides formed by reacon between the reducing metal and the oxygen content f the coating being reduced. After filtering off the reuced metal powder, it can be dried to free it of residual olvent.

COMPACTING THE POWDER

In a further aspect of the invention, the powder preared as above described is compacted to a solid metalferous product. This can be done by compacting the owder to a dense mass, as by pressing in a die, by exuding, by rolling, or by any of the techniques used in owder metallurgy. The compacted mass of metal should ave a density upwards of 95 percent of theoretical, preferably upwards of 98 percent. The "green" compact ormed can be sintered, as at temperatures up to 90 perent of its melting point for up to 24 hours, to give it ifficient strength to hold together during subsequent orking operations. Preferably, such sintering is efcted in an atmosphere of clean, dry hydrogen.

The formed body so obtained can be subjected to innsive working, preferably at elevated temperatures. he working forces should be sufficient to effect plastic ow in the metals. Working should be continued until omogenization of the refractory oxide-metal grains is bstantially complete. Homogeneity can be deterined by metallographic and chemical analyses. Because e refractory oxide in the metal originally was present as substantially discrete particles, the worked metal product is characteristically substantially free of "fibering"— that is, alignment of refractory particles in the direction of working.

While working can be accomplished by such methods as swageing, forging, and rolling, it is especially preferred to effect working by extruding the above-mentioned green compact through a die under extreme pressure, at temperatures approaching the melting point of the metal present—say, from 85 to 95% of the melting temperature in degrees absolute. Because the compositions of the invention are very hard, the working conditions needed are much more severe than for the unmodified metals. In the case of extrusion of a billet, the reduction in crosssectional area preferably is upwards of 90%. Welding of the metal grains becomes nearly complete.

Example 1

By coprecipitating chromium oxycarbonate and colloidal thoria and reducing the oxycarbonate with calcium metal in a fused salt bath, thoria-filled chromium is obtained.

The reactor used to deposit the chromium oxycarbonate on the colloidal thoria consisted of a stainless steel tank with a conical bottom. The bottom of the tank was attached to a stainless steel circulating line, to which there were attached three inlet pipes through T's. The circulating line passed through a centrifugal pump and thence returned to the tank.

Initially, the tank was charged with 10 gallons of water, which was about ⅕ of the capacity of the tank. Three feed solutions were prepared as follows: ($a$) 40.6 lbs. of chromium nitrate, $Cr(NO_3)_3 \cdot 9H_2O$, dissolved in 5 gallons of water, ($b$) 30 lbs. of ammonium carbonate dissolved in 5 gallons of water, and ($c$) 20 liters of a colloidal aquasol containing 3 percent thoria, in the form of 5 to 10 millimicron discrete particles, diluted to 5 gallons with water. These three feed solutions were metered in through calibrated liquid flowmeters at equal rates into the circulating stream, which initially consisted of water. The pH of the slurry in the tank was maintained between 7.0 and 8.0 during the run, and was 7.6 at the end of the run. The time of addition of the reactants was 40 minutes, the reactants being added at room temperature.

The resulting slurry contained precipitated particles which consisted of hydrous chromium oxycarbonate and colloidal thoria. This precipitate was filtered, and washed with water to remove most of the soluble salt. It was then dried for 40 hours at 250° C. and micropulverized, to give a product which passed 100 mesh. This powder was dried overnight at 650° C., and then heated for three hours at 850° C. The analysis of the product was 18.1 percent $ThO_2$ and 78.9 percent $Cr_2O_3$. X-ray linebroadening studies showed that the chromia coating consisted of crystallites about one micron in size. The thoria particles entrapped in this chromia coating had an average size of about 40 millimicrons.

The product thus obtained was reduced by treating it with calcium metal in a fused salt bath. The reactor consisted of a chromium plated Inconel vessel, equipped with a stirrer and a thermocouple well. The atmosphere in the vessel was purified argon, the argon having been completely dried and freed of oxygen and nitrogen by passing it through an alumina drying tube, then passing it over chromium metal chips, and finally over titaniumzirconium chips, the chips being maintained at a temperature of about 850° C.

The reactor was charged with about 500 grams of molten calcium chloride. The reaction was conducted under substantially stoichiometric conditions; thus, increments of 15.6 grams of calcium pellets, consisting of pure calcium metal, were added alternately with increments of 25 grams of thoria-chromia dispersion. Simultaneously with the addition of the chromia-thoria there was added 100 grams of cold anhydrous calcium chloride. This calcium chloride served to adsorb the heat which was liberated during the reduction reaction. This reaction proceeded essentially under isothermal conditions, the temperature being in the range of 850° C. to 900° C.

After all the chromia in the coating had been reduced, the 100 grams of excess calcium was added to the fused salt mixture, in order to scavenge any remaining oxygen. Finally, the fused salt mixture was cooled under an argon atmosphere.

The product was isolated by leaching the salt, calcium oxide, and excess calcium mixture with a 5 percent acetic acid-water solution. The metal powder so obtained was washed with dilute acetice acid, water, and finally acetone, and was dried in a vacuum oven at 70° C. The powder obtained consisted of particles 100 to 200 mesh in size.

Chemical analysis showed this product to contain 75.5 percent chromium, 24.0 percent thoria, 0.2 percent iron, a trace of nickel and calcium, and approximately 0.1 percent oxygen more than that associated with the thoria. This corresponds to about 0.3 percent unreduced chromic oxide. It is believed that this amount of chromic oxide was incorporated in the thoria lattice rather than being present as $Cr_2O_3$, since no free $Cr_2O_3$ was obtained by dissolving the material in dilute hydrochloric acid. The thoria particles recovered by dissolving in acid were in the size range of 30 to 60 millimicrons. The particles were discrete, since after such treatment of the Cr—$ThO_2$ with hydrochloric acid, a stable aquasol of thoria was obtained.

The product had a surface area of 0.05 m.²/g., and it was not pyrophoric, i.e., it showed no tendency to heat up when exposed to the air. It had a density of 7.2 g./ml. This corresponds to about 90 percent of the density calculated from the density of thoria and chromium, respectively. The thoria particles in the product had a number average particle size of 50 millimicrons.

This chromium-thoria masterbatch is used to prepare alloys of chromium, particularly alloys such as alloys with nickel similar to "Nichrome," "Haynes Alloy 25," and other, similar high-temperature alloys. This is done by powder metallurgy techniques. For example, one can blend such a chromium-thoria composition as described in this example with "carbonyl" nickel powder to yield an improved nickel-chromium (80:20) alloy. By virtue of the thoria dispersed in the chromium metal, such alloys have improved high-temperature properties, particularly improved high-temperature yield strength, stress rupture, and creep resistance.

*Example 2*

A procedure substantially identical with that used in Example 1 is used to prepare dispersions of $ThO_2$ in titania, vanadium oxide, and niobium oxide. The thoria colloid is metered in with the appropriate water soluble salts (e.g., basc titanium chloride, etc.) and precipitated with a suitable precipitating agent. The product is then dried and reduced in a fused salt bath.

The reduction conditions for the niobium and vanadium masterbatches are quite similar to those used for chromium. The isolation technique employed is also similar. Substantially theoretical yields of $ThO_2$-filled niobium and vanadium can be obtained. X-ray line-broadening studies show that the $ThO_2$ is still well within the colloidal size range.

Somewhat more severe reduction conditions are employed in reducing the titania containing dispersed thoria. The temperature is raised to 1000° C. for this reaction. The stoichiometric procedure is employed. The thoria particles in titanium recovered after this reaction are somewhat larger than in the case of chromium, vanadium, and niobium. Their average particle size is between 0.5 and 1 micron.

*Example 3*

A dispersion of mixed rare earth oxides in chromiun oxide was made by a technique identical with that employed in Example 1. This material was reduced in sodium chloride salt bath using metallic sodium rathe than calcium as the reducing agent; otherwise, the technique used was as in Example 1.

In isolating the product, the excess sodium was reacte with methyl alcohol prior to adding water to the sal mixture. Colloidal dispersions of mixed rare earth oxide in chromium metal were obtained as products. The rar earth oxide mixture contained 3 percent by weight o the rare earth colloid. The powder particles had density of 97 percent of theoretical and a surface are of 0.03 m.²/g. The rare earth particles dispersed in th product had a number average particle size of 30 milli microns.

A similar preparation can be carried out using $Al_2O$ in place of the rare earth oxide. The alumina dispersio can contain 15 percent colloidal alumina. The alumin particle size is considerably larger than that in the rar earth oxide dispersion.

*Example 4*

A composition containing 4 percent colloidal thoria b volume was coprecipitated in a mixture of the hydrou oxides of iron, chromium, and nickel, in such propor tions that the weight ratio of iron to chromium to nicke after reduction would be 72:18:8. This was done b precipitating a mixture of nickel, iron, and chromiur nitrates with ammonium carbonate, while feeding a col loidal thoria sol into a common mixing zone, using th technique described in Example 1. After drying to th anhydrous condition, this material was then treated wit hydrogen in two stages in a furnace. In the first stage a substantially complete reduction of the iron and nicke oxide content of the coating was achieved in 12 hour at 1000° C. The product was then given an additione treatment with hydrogen for 4 hours at a temperatur of 1150° C. Analysis showed that the oxygen conter was still about 4 percent, exclusive of that which wa contained in the thorium oxide filler.

To complete the reduction the product was mixed wit 3 times its weight of calcium chloride and 25 percent o metallic calcium based on the weight of the whole com position. This mixture was heated under argon for hours at a temperature of 880° C. The fused salt bat was quenched to a temperature of 25° C., and the sa cake pulverized and dissolved in water containing little acetic acid. The iron-, chromium-, and nickel-cor taining powder residue was filtered and dried. Analys showed that a substantially complete reduction had bee achieved.

This product was used to prepare a stainless steel reir forced with colloidal thoria particles by pressing th powder into a billet under a pressure of 20 tons p.s.i sintering in hydrogen at 1100° C. for 24 hours, an extruding from a 1 inch to a one-fourth inch diameter t prepare a rod of substantially theoretical density. Tes of its high temperature tensile and stress-rupture prop erties showed that they were greatly improved over thos of wrought stainless steel.

Rather than a two-stage reduction, one can prepai a modified stainless steel composition as described abov by reducing all the oxides, i.e., NiO, $Fe_2O_3$, and $Cr_2O$ with metallic calcium in a fused salt bath. This requir more calcium, but it eliminates one step in the prepar tion of the product, i.e., the hydrogen reduction. Sinc the heat liberated on reducing NiO or $Fe_2O_3$ with hydr gen can be excessive, care should be exercised in tk early stages of reduction to add the calcium slowly.

*Example 5*

A nickel-chromium alloy containing 5 volume percei thoria was prepared in the following manner. Using eactor similar to, but smaller than, that described in Example 1, a hydrous nickel oxide-chromium oxide-thoria precipitate was prepared. Thus, through the first T, 5 liters of a solution containing 3052 grams Ni(NO₃)₂·6H₂O and 1132 grams Cr(NO₃)₃·9H₂O was fed. Into the second was fed 5 liters of thoria sols, made from 1440 grams of 2.5 percent ThO₂ sols (10 millimicrons ThO₂) and into the third, 5.5 liters of 30 percent (NH₄)₂CO₃. During the preciptiation the pH was maintained at 7.2.

The pulverized powder was reduced as in Example 1, using calcium metal, but during the early stages of the reduction the temperature was maintained at 820° C.

A similar process can be applied to

Cr₂O₃—WO₃—ThO₂ mixtures, as prepared by reacting (NH₄)₆W₇O₂₄ solutions, Cr(NO₃)₃ solutions, and ThO₂ aquasols with NH₄)₂CO₃ solution. In any of the preparations in this and other examples, one can substitute BeO aquasols for ThO₂.

This application is a continuation-in-part of our co-pending application Serial No. 744,930, filed June 27, 1958, now abandoned.

1. In a process for producing a dispersion of an oxide in a metal the steps comprising forming a coating of a hydrous, oxygen-containing compound of a metal, the metal being one having an oxide with a free energy of formation at 27° C. of 75 to 105 kilocalories per gram atom of oxygen in the oxide, said coating being formed around particles of a refractory metal oxide which is stable up to 1000° C., has a melting point above 1000° C., has a free energy of formation at 1000° C. above about 100 kilocalories per gram atom of oxygen in the oxide, and is in the form of substantially discrete particles having an average dimension of 5 to 500 millimicrons, dispersing the compound-coated refractory oxide particles in a molten salt, adding a reducing metal selected from the group consisting of alkali and alkaline earth metals in a proportion at least stoichiometrically equivalent to the oxidizing element of the coating, heating the mixture at a temperature in the range from 400 to 1200° C. whereby the coating is reduced to the metal originally present as compound, and separating the resulting metal-coated refractory oxide particles as a powder from the other products of the reduction reaction and from the salt.

2. A process of claim 1 in which the refractory oxide particles are coated with the hydrous, oxygen-containing compound of the metal by coprecipitating the refractory metal oxide from a colloidal dispersion thereof and the hydrous, oxygen-containing metal compound from a solution of a soluble salt of said metal.

3. A process of claim 1 in which the metal-coated refractory oxide powder is compacted to a solid metalliferous product and is intensively worked until the density is upwards of 96% of theoretical density.

4. A process of claim 1 in which the metal of the coating on the refractory oxide is a metal having a melting point above 1200° C. and is selected from the group consisting of manganese, niobium, silicon, tantalum, titanium, vanadium and chromium.

5. A process of claim 1 in which the refractory oxide is an oxide of a metal selected from the group consisting of yttrium, calcium, lanthanum, beryllium, thorium, magnesium, uranium, hafnium, cerium, aluminum, and zirconium.

6. In a process for producing a dispersion of an oxide in a metal the steps comprising forming an aqueous colloidal dispersion of substantially discrete particles of a refractory metal oxide which is stable up to 1000° C., has a melting point above 1000° C., and has a free energy of formation at 1000° C. above about 100 kilocalories per gram atom of oxygen in the oxide, the refractory being an oxide of a metal selected from the group consisting of yttrium, calcium, lanthanum, beryllium, thorium, magnesium, uranium, hafnium, cerium, aluminum, and zirconium, coprecipitating the refractory oxide from said dispersion together with a coating of an insoluble hydrous, oxygen-containing compound of a metal, the metal being selected from the group consisting of chromium, manganese, niobium, silicon, tantalum, titanium, and vanadium, dispersing the compound-coated refractory oxide particles in a molten salt, adding a reducing metal selected from the group consisting of alkali and alkaline earth metals in a proportion at least stoichiometrically equivalent to the oxidizing element of the coating, heating the mixture in the range from 400 to 1200° C. whereby the coating is reduced to the metal originally present as compound, separating the resulting metal-coated refractory oxide particles as a powder from the other products of the reduction reaction and from the salt, compacting the powder to a solid, metalliferous product, and intensively working the product until its density is upwards of 96% of theoretical density 7. In a process for producing a dispersion of an oxide in a metal the steps comprising forming a coating of a hydrous, oxygen-containing compound of a metal, the metal being one having an oxide with a free energy of formation at 27° C. of 75 to 105 kilocalories per gram atom of oxygen in the oxide, said coating being formed around particles of a refractory metal oxide which is stable up to 1000° C., has a melting point above 1000° C., has a free energy of formation at 1000° C. above about 100 kilocalories per gram atom of oxygen in the oxide, and is in the form of substantially discrete particles having an average dimension of 5 to 500 millimicrons, dispersing the compound-coated refractory oxide particles in a molten salt, adding a reducing metal selected from the group consisting of alkali and alkaline earth metals in a proportion at least stoichiometrically equivalent to the oxidizing element of the coating, said reducing metal being one which has an oxide having a free energy of formation at 27° C. which is greater than the free energy of formation at 27° C. of the oxide of the metal in the hydrous, oxygen-containing compound being reduced but less than the free energy of formation at 27° C. of the particulate refractory oxide, heating the mixture at a temperature in the range from 400 to 1200° C. whereby the coating is reduced to the metal originally present as compound, and separating the resulting metal-coated refractory oxide particles as a powder from the other products of the reduction reaction and from the salt.

8. In a process for producing a dispersion of an oxide in a metal the steps comprising forming a coating of a hydrous, oxygen-containing compound of a metal, the metal being one having an oxide with a free energy of formation at 27° C. of 75 to 105 kilocalories per gram atom of oxygen in the oxide, said coating being formed around particles of a refractory metal oxide which is stable up to 1000° C., has a melting point above 1000° C., has a free energy of formation at 1000° C. above about 100 kilocalories per gram atom of oxygen in the oxide, and is in the form of substantially discrete particles having an average dimension of 5 to 500 millimicrons, dispersing the compound-coated refractory oxide particles in a molten salt, adding calcium metal as a reducing agent in a proportion stoichiometrically equivalent to the oxidizing element of the coating, heating the mixture at a temperature in the range from 400 to 1200° C. whereby the coating is reduced to the metal originally present as compound, and separating the resulting metal-coated refractory oxide particles as a powder from the other products of the reduction reaction and from the salt.

References Cited in the file of this patent

UNITED STATES PATENTS 2,847,299    Keller et al. _____ Aug. 12, 1958
2,949,358    Alexander et al. _____ Aug. 16, 1960